W. DOINIKOFF.
ALTERNATING CURRENT DYNAMO ELECTRIC MACHINE.
APPLICATION FILED APR. 28, 1909.

1,061,529.

Patented May 13, 1913.
3 SHEETS—SHEET 1.

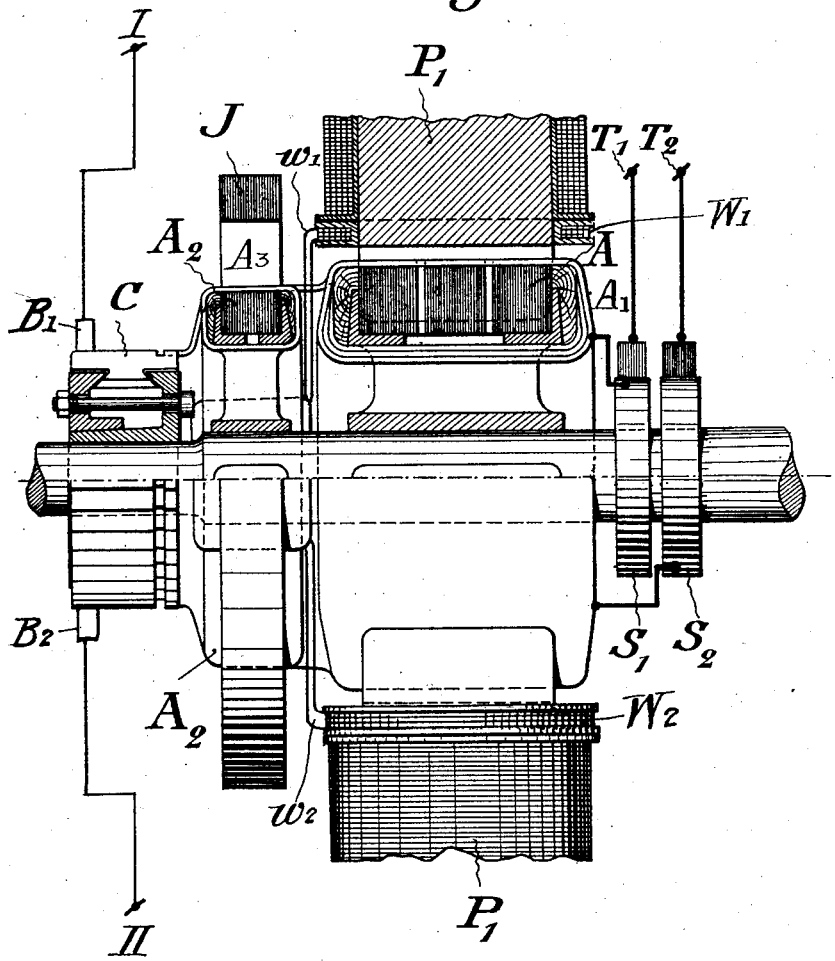

UNITED STATES PATENT OFFICE.

WLADIMIR DOINIKOFF, OF BADEN, SWITZERLAND.

ALTERNATING-CURRENT DYNAMO-ELECTRIC MACHINE.

1,061,529.  Specification of Letters Patent.  Patented May 13, 1913.

Application filed April 28, 1909. Serial No. 492,766.

*To all whom it may concern:*

Be it known that I, WLADIMIR DOINIKOFF, engineer, a subject of the Russian Emperor, residing at 599 Bruggerstrasse, Baden, Switzerland, have invented certain new and useful Improvements in Alternating-Current Dynamo-Electric Machines; and I do hereby declare the following to be a full, clear, and exact description of the invention, such as will enable others skilled in the art to which it appertains to make and use the same.

This invention relates to means for suppressing sparking at the commutator brushes in a rotary converter designed to convert single phase alternating current into continuous current and also in the so-called cascade converters, the said means also serving to increase the torque of such converters.

The invention generally considered may be regarded as a further development of the invention covered by my prior Patent, No. 907,578, granted December 22, 1908, and is intended to simplify the application of the general principle enunciated in my prior patent as applied to rotary converters and the like.

It is well known that the commutator potential curve of a synchronously rotating single phase to continuous current converter may be regarded as split up into two rotating sine waves, one of which remains stationary relative to the brushes, and the other rotates at high speed. If the brushes are situated at the summits of the stationary commutator potential curves, generally speaking, no serious sparking at the commutator brushes will result. The commutator potential curve which rotates at a high speed, however, introduces serious difficulties in commutation and in order to reduce these difficulties as far as possible, it has been proposed to employ the so-called damping devices, consisting of short circuited windings inserted in the field poles. The effect of the reactance of the main armature winding and of the damping windings in this latter arrangement is such however as to render the damping devices unsatisfactory, particularly when applied to machines of large size.

The prevent invention is designed to overcome the difficulties aforesaid by applying means to produce a flattening of the rapidly rotating commutator potential curve by static induction, that is to say, pulsation of the magnetic flux in an auxiliary armature winding which is rendered effective by means of commutating poles located at points adjacent the commutating brushes.

Figure 1:
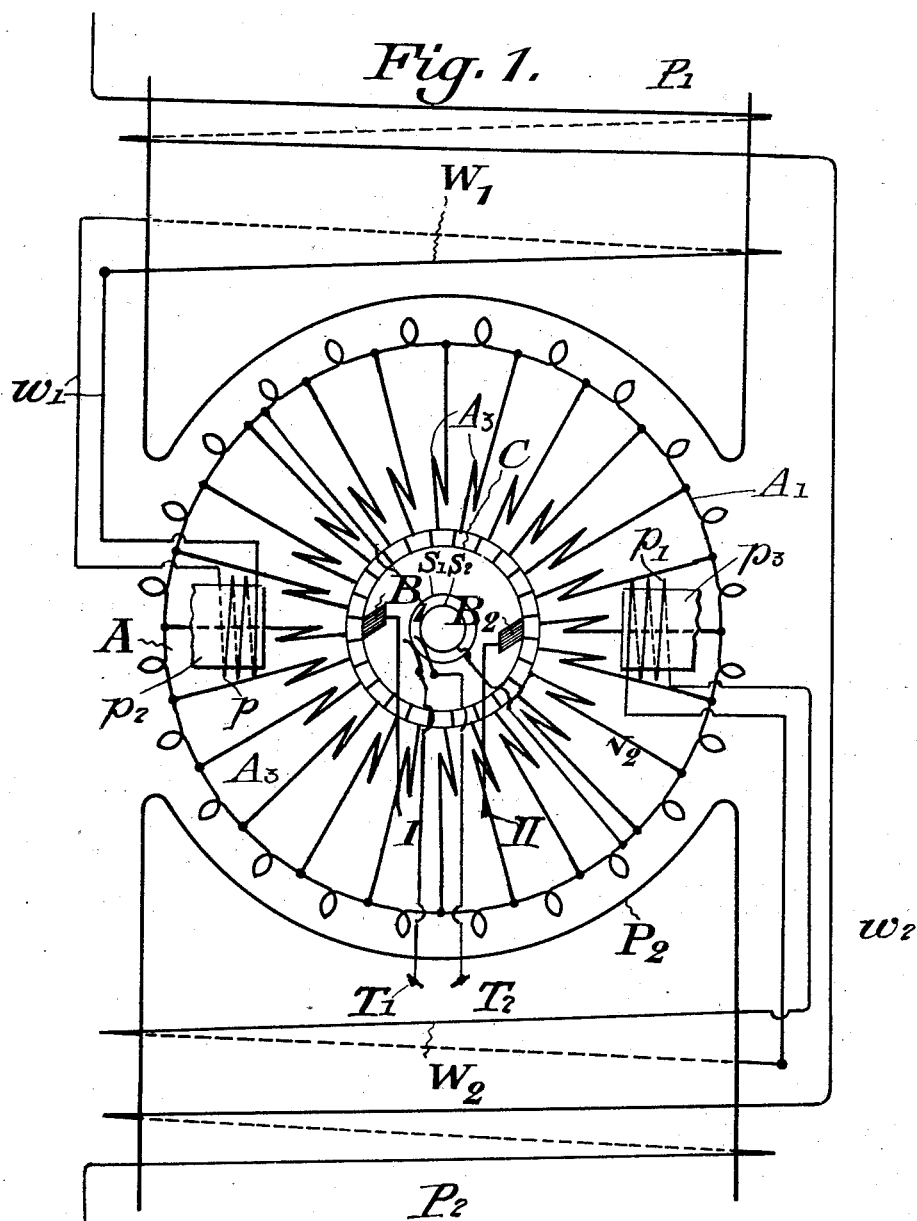
Figure 2:
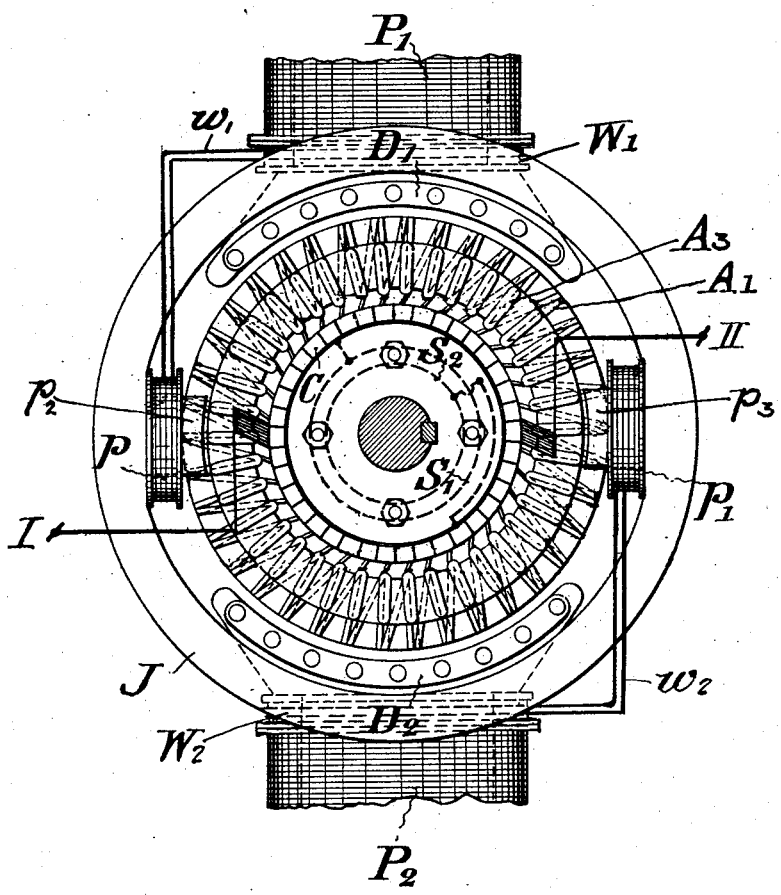

The invention is illustrated in the accompanying drawings, in which,

Figure 1 is a diagrammatic representation of an ordinary type of rotary converter having the invention applied thereto. Fig. 2 is a partial side elevation of a commercial form of the apparatus, some of the parts being omitted so as to avoid complicating the illustration. Fig. 3 is a front elevation partly in section of the apparatus shown in Fig. 2.

Referring to the drawings, it will be noted that the illustration is directed to the same type of machine in each instance and is to be regarded as exemplary of the invention.

In the drawings, A indicates the armature core of a rotary converter having a winding $A_1$ which is of the usual form. Mounted on the shaft of the machine and in alinement with the armature core A is an auxiliary armature core $A_2$ which is provided with the auxiliary windings $A_3$, which are separate coils inserted in the leads between the main windings $A_1$ and the commutator, as clearly illustrated in Figs. 1 and 3 and each section of the winding $A_3$ is connected to a segment of a commutator C of the usual form. Surrounding the armature core A is the usual yoke piece K to which are secured the main poles $P_1$, $P_2$, provided with suitable exciting windings common to rotary converters of this type. Said poles $P_1$, $P_2$ are preferably provided with the usual form of damper indicated by $D_1$ and $D_2$. Surrounding the auxiliary armature core $A_2$ is the annular yoke J provided with auxiliary poles $p_2$, $p_3$, said auxiliary poles being diagrammatically illustrated in Fig. 1 and shown in the proper relation in a commercial machine in Fig. 2.

$T_1$, $T_2$ indicate the alternating current leads which are connected to the usual form of slip rings $S_1$ and $S_2$ which are in turn electrically connected with the main armature winding $A_1$. The resultant direct current from the rotary converter is taken from the commutator C by means of brushes $B_1$, $B_2$, which are connected to the direct current terminals I, II.

Mounted upon the main poles $P_1$ and $P_2$ are two special auxiliary windings which feed the auxiliary windings $p$, $p_1$ of the auxiliary or compensating poles $p_2$, $p_3$. The winding $W_1$ is connected with the pole winding $p$ by means of the conductor $w_1$ and similarly the winding $W_2$ is connected with the corresponding pole winding $p_1$, by means of conductors $w_2$.

The rapidly rotating magnetic field, corresponding to the rapidly rotating commutator curve induces a pulsating electro-motive force in the windings $W_1$, $W_2$, which being impressed upon the exciting windings of the auxiliary commutating poles $P_1$, $P_3$ induces a commutating or corrective electromotive force in the auxiliary armature winding $A_3$ which effectively suppresses sparking at the commutator brushes $B_1$ and $B_2$.

What I claim is:—

1. A rotary converter comprising a main armature core, an auxiliary armature core, a winding on the main core, a winding on the auxiliary core inserted between the main winding and the commutator, main field poles, an exciting winding on said field poles, a separate inductive winding on said field poles, commutating poles in magnetic relation with said auxiliary iron core, a winding on said commutating poles fed from said second winding on the main field poles, and a commutator to which the conductors of said main winding are connected.

2. A rotary converter comprising a main armature core, a winding on said main armature core, a commutator to which the conductors of said winding are connected, an auxiliary armature core between the main armature core and the commutator, the conductors between said main winding and the commutator being looped around said auxiliary armature core, main field poles, an exciting winding on said field poles, a separate inductive winding on said field poles with which the flux of the field poles is interlinked, commutating poles in magnetic relation with said auxiliary iron core, and windings on said commutating poles fed from said second winding on the main field poles.

In testimony whereof I have affixed my signature, in presence of two witnesses.

WLADIMIR DOINIKOFF.

Witnesses:
MARIE SCHUMANN,
CARL GUBLER.